United States Patent
Boisseau

(10) Patent No.: US 6,997,291 B2
(45) Date of Patent: Feb. 14, 2006

(54) VEHICLE DISK BRAKE WITH A MOTION CONVERTER

(75) Inventor: Jean-Pierre Boisseau, Paris (FR)

(73) Assignee: Robert Bosch GmbH, Stuttgart (DE)

( * ) Notice: Subject to any disclaimer, the term of this patent is extended or adjusted under 35 U.S.C. 154(b) by 20 days.

(21) Appl. No.: 10/487,364

(22) PCT Filed: Jun. 19, 2002

(86) PCT No.: PCT/FR02/02118

§ 371 (c)(1),
(2), (4) Date: Feb. 20, 2004

(87) PCT Pub. No.: WO03/002887

PCT Pub. Date: Jan. 9, 2003

(65) Prior Publication Data

US 2005/0103581 A1    May 19, 2005

(30) Foreign Application Priority Data

Jun. 21, 2001 (FR) ................... 01 08309

(51) Int. Cl.
F16D 65/14 (2006.01)

(52) U.S. Cl. ................ 188/106 F; 188/71.7; 188/72.7; 188/72.9

(58) Field of Classification Search ............... 188/71.7, 188/72.4, 72.6, 72.7, 72.8, 72.9, 106 F, 106 P
See application file for complete search history.

(56) References Cited

U.S. PATENT DOCUMENTS

| | | | | |
|---|---|---|---|---|
| 3,638,763 A | * | 2/1972 | Laverdant | 188/72.6 |
| 3,765,513 A | * | 10/1973 | Brooks | 188/71.9 |
| 3,991,859 A | * | 11/1976 | Coulter et al. | 188/71.9 |
| 5,038,895 A | * | 8/1991 | Evans | 188/72.7 |
| 5,060,765 A | * | 10/1991 | Meyer | 188/71.9 |
| 5,586,623 A | * | 12/1996 | Mery | 188/72.6 |
| 5,607,033 A | * | 3/1997 | Naedler et al. | 188/71.8 |
| 5,697,475 A | * | 12/1997 | Le Deit et al. | 188/72.9 |
| 5,868,225 A | * | 2/1999 | Hulliger | 188/72.4 |
| 6,478,120 B1 | * | 11/2002 | Runkel et al. | 188/71.9 |
| 6,749,044 B1 | * | 6/2004 | Boisseau | 188/72.7 |

FOREIGN PATENT DOCUMENTS

WO    WO 00/37820    *  6/2000

* cited by examiner

Primary Examiner—Devon C. Kramer
(74) Attorney, Agent, or Firm—Leo H. McCormick, Jr.; Warren Comstock

(57) ABSTRACT

A disc brake for a vehicle having a housing with a cavity therein that is divided by a thrust plate into a fluid chamber and an atmospheric chamber. A converter located in the fluid chamber includes a fixed reaction plate and a sliding plate that are separated by a plurality of balls located in variable depth grooves in the sliding plate and a reaction plate. A rotary input applied to an input shaft caused the sliding plate to rotate and move linearly as the balls move within the grooves to provides a force that acts through the thrust plate to moves a piston that is located in the atmospheric chamber to effect a mechanical brake application. Pressurized fluid supplied to the fluid chamber acts on the thrust plate that moves thrust plate and moves the piston to effect a hydraulic brake application.

2 Claims, 6 Drawing Sheets

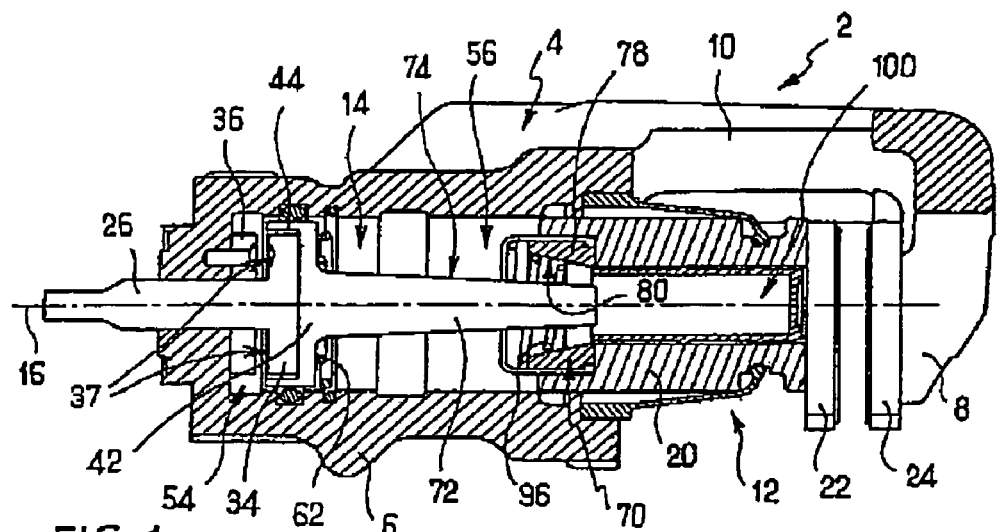
FIG_1
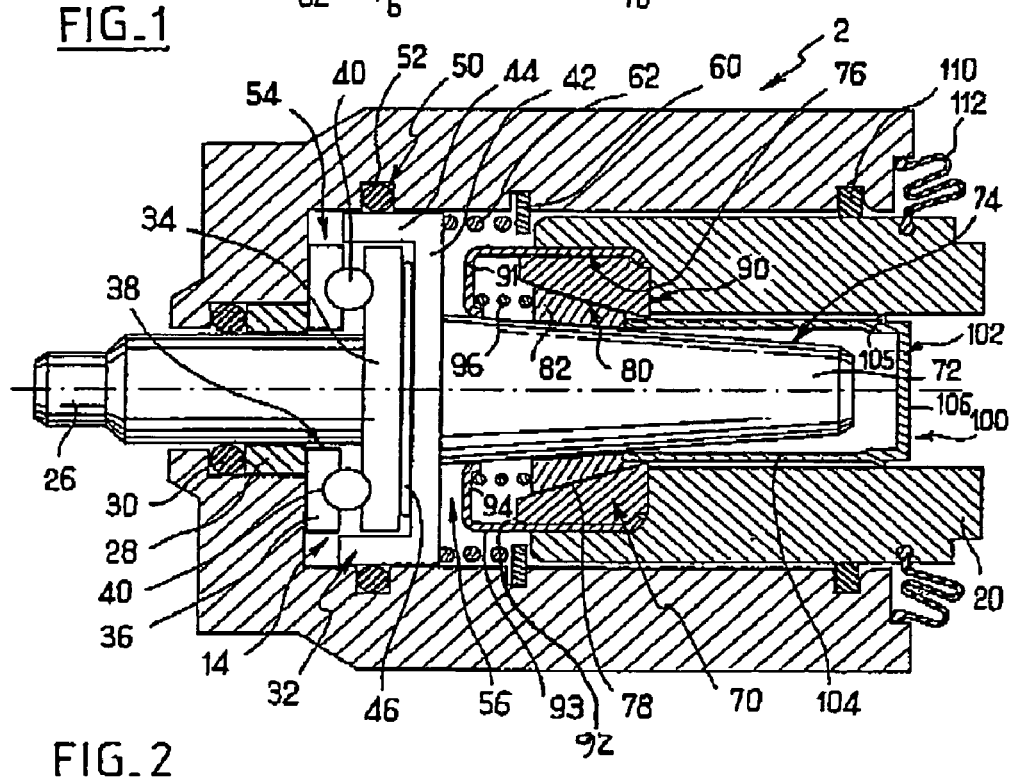
FIG_2

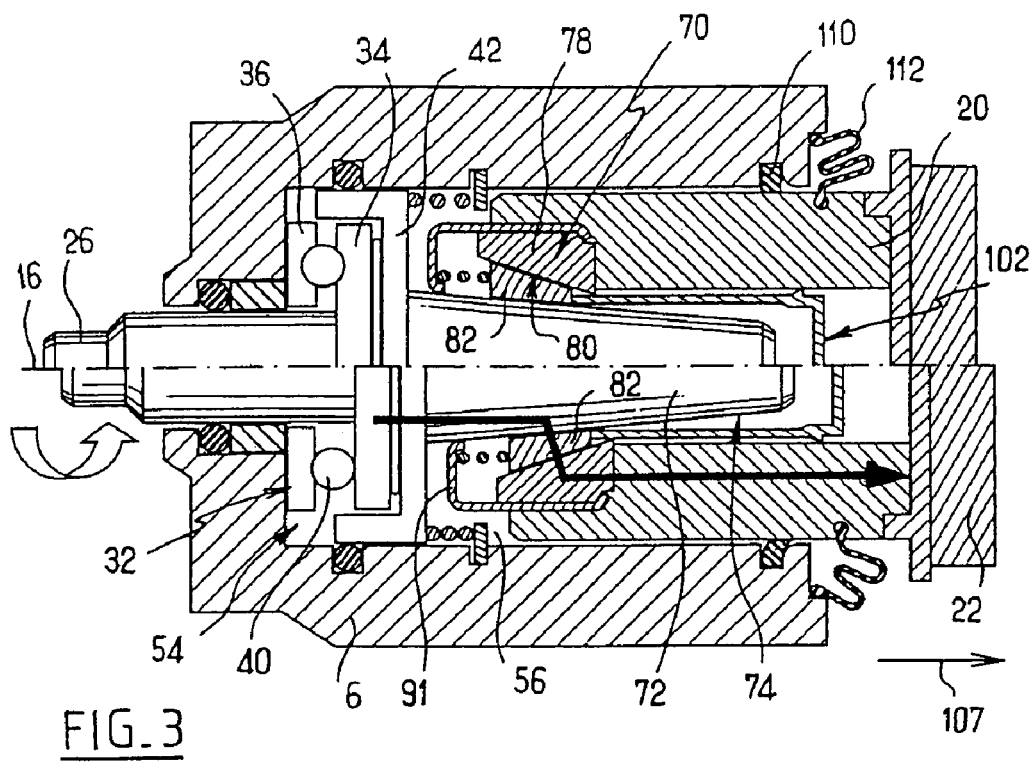
FIG_3
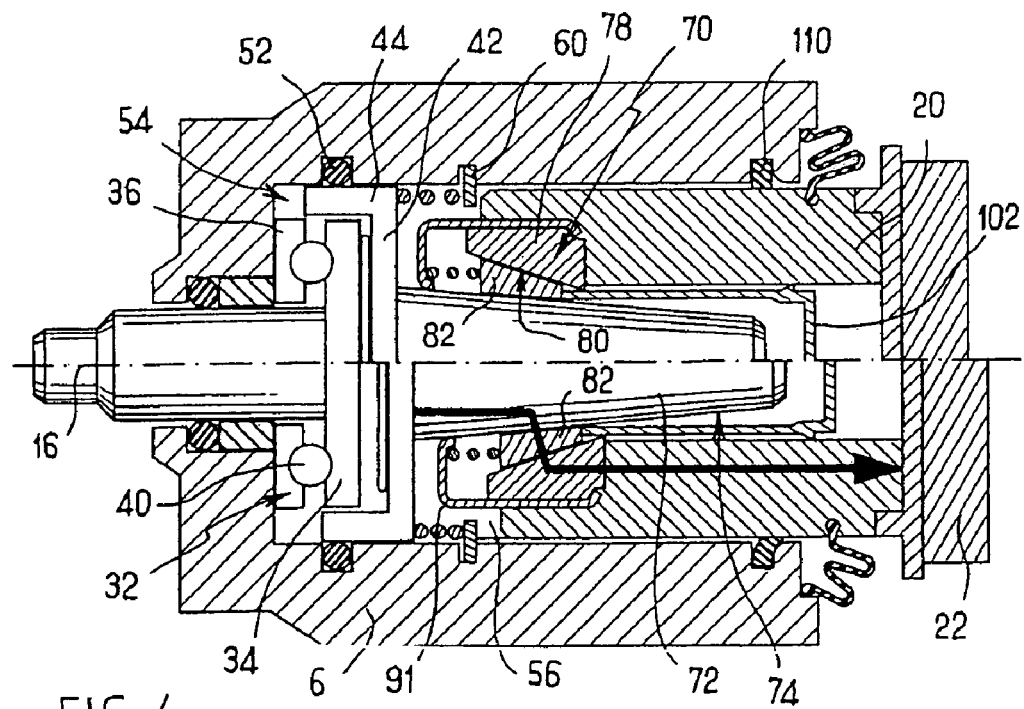
FIG_4

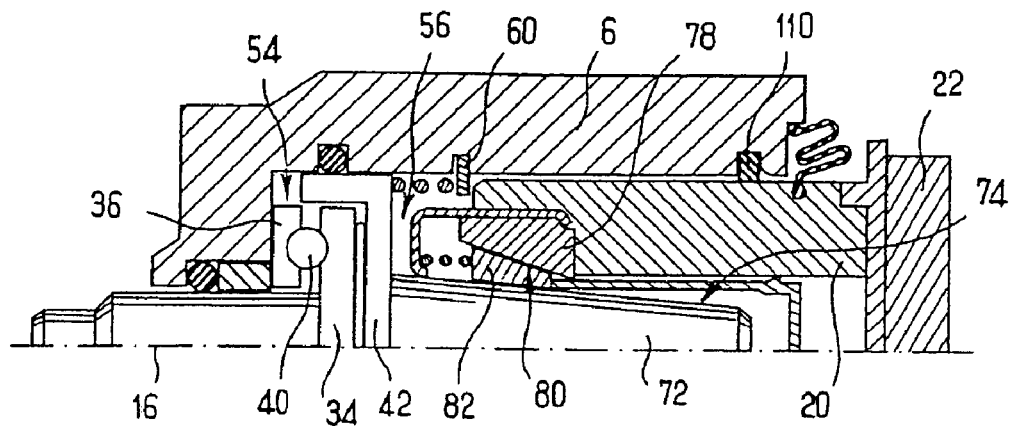
FIG_5
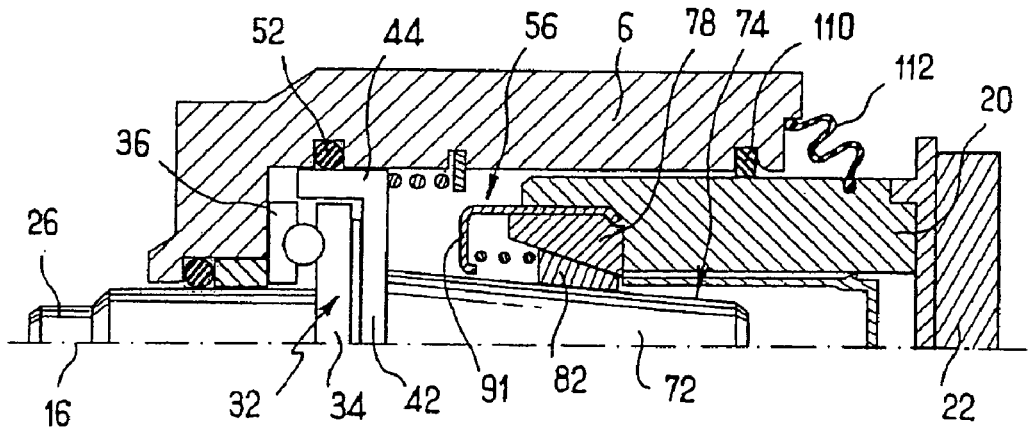
FIG_6
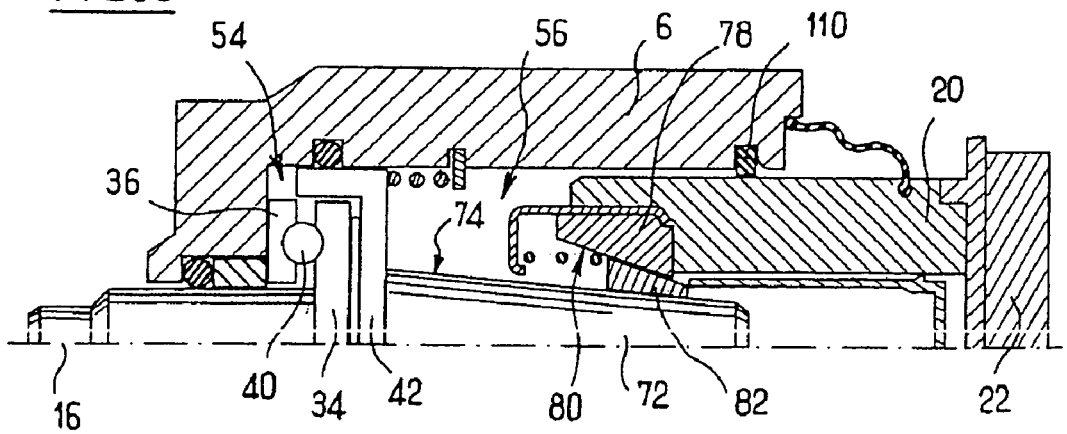
FIG_7

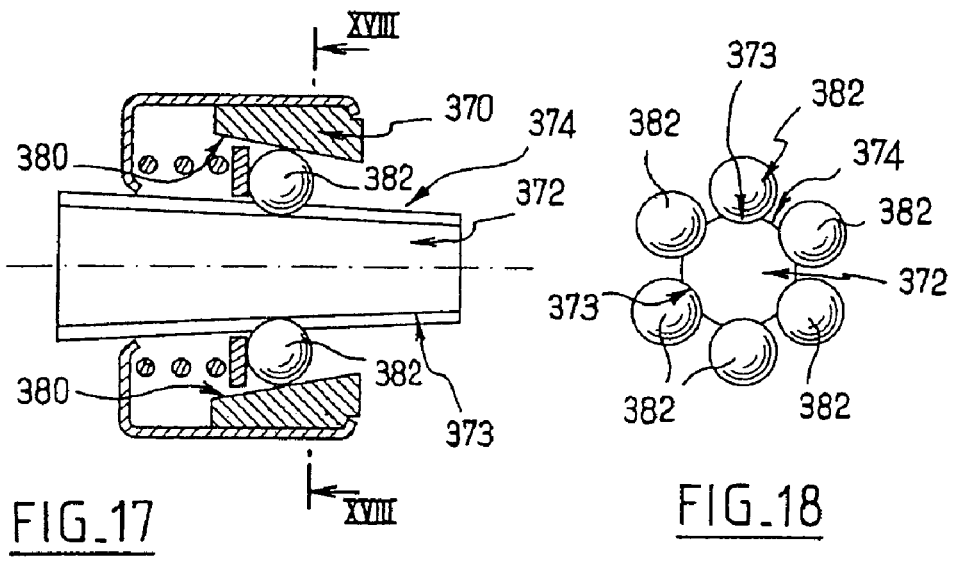
FIG_17   FIG_18
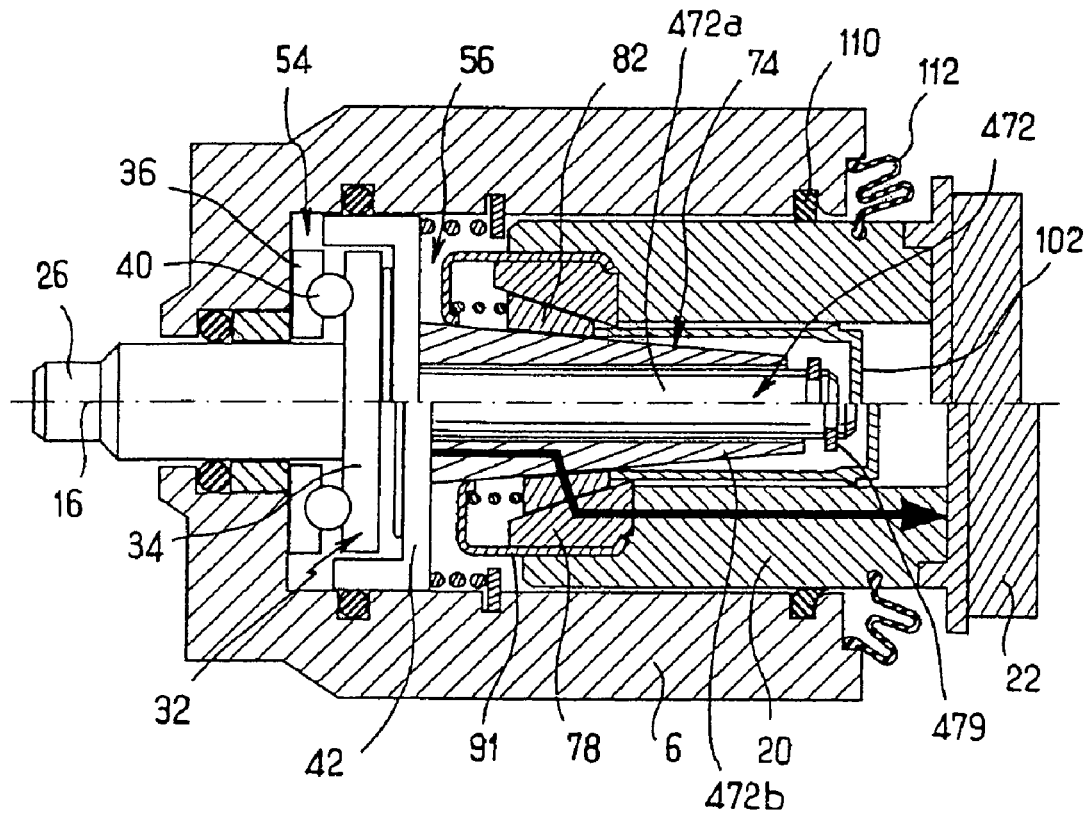
FIG_19

VEHICLE DISK BRAKE WITH A MOTION CONVERTER

The invention relates to vehicle disc brakes with built-in parking brake.

BACKGROUND OF THE INVENTION

Disc brakes in which the rotational movement of an input shaft is converted into a sliding movement of a plate so as to push a piston bearing one of the brake pads is known. An adjuster for compensating for pad wear is inserted between the plate and the piston. It for example comprises a push-rod forming a screw/nut assembly able to increase its length automatically in response to pad wear. Actuation of the shaft by means of the parking brake lever handle causes mechanical application of the brakes. Furthermore, the piston defines, with the brake caliper, a chamber of fluid such that fluid pressure on the piston through actuation of the brake pedal and by means of the hydraulic circuit causes the piston to slide in order to apply the brakes.

In such a brake, most of the parts able to transmit mechanical force to the piston in the case of operation of the brake are bathed in the chamber of fluid. In addition, in the event of braking being commanded via the hydraulic circuit, the pressure is applied to the piston and displaces it, driving certain parts of the mechanical connection along with it. More specifically, a first part of the moving gear follows the piston until the wear compensating pushrod extends, then, as the latter forms a pressure sensor, it is all of the moving gear which moves. In consequence, some of the energy of the fluid is wasted on moving parts whose movement makes no contribution to the actual braking effort.

SUMMARY OF THE INVENTION

One object of the invention is to provide a brake of a different type which, during a braking action, avoids moving parts which do not contribute to the actual braking effort and also avoids placing certain parts in contact with the brake fluid.

To this end there is provided a vehicle disc brake comprising an actuator and a piston bearing a brake lining and designed so that a movement of the actuator displaces the piston, the brake comprising a chamber of fluid designed so that pressure on the fluid displaces the piston, the actuator delimiting the chamber in such a way that the piston is remote from the chamber.

In other words, the disc brake comprises a piston, an actuator forming part of a mechanical first means of actuation of the piston and also forming part of a hydraulic second means of actuation of the piston, the brake also comprising a chamber of fluid designed so that pressure on the fluid displaces the piston, characterized in that the actuator delimits the chamber in such a way that the piston is remote from the chamber.

Thus, an upstream hydraulic chamber and a downstream dry chamber contiguous with the piston are delimited. In the latter chamber the parts are no longer acted upon by the fluid during hydraulic action and are not bathed in the fluid. In addition, because of this arrangement, the number of moving parts actually transmitting the braking effort can be higher, whether this be in the case of hydraulic operation or the case of mechanical operation.

What is more, the invention improves brake safety by moving the hydraulic chamber away from the disc. What happens is that friction of the lining on this disc gives out a great deal of heat. Now, when the hydraulic chamber is close to the disc, as it is in the prior art, there is a risk of this heat heating up the oil that forms the fluid and causing water vapour to appear therein (as the oil generally contains traces of liquid water). Now, this lowers the boiling point of the oil, and this may have a serious adverse effect on braking efficiency. The fact of moving the piston away from the hydraulic chamber therefore greatly lessens this risk.

The invention may also have at least any one of the following features:

- the brake comprises an input shaft and a converter for converting a rotational movement of the shaft into a sliding movement of the actuator;
- the brake comprises first mechanical means comprising an input shaft and a converter for converting a rotational movement of the shaft into a sliding movement of the actuator;
- the actuator comprises a thrust plate, the converter comprising a reaction plate and balls inserted between the thrust plate and reaction plate, the converter having grooves in which the balls are housed;
- the converter comprises a sliding plate secured to the shaft and inserted between the thrust plate and reaction plate, the balls lying between the reaction plate and the sliding plate;
- the converter comprises a sliding lining in contact with the sliding plate and thrust plate;
- the thrust plate forms a housing accommodating the sliding plate;
- the reaction plate is fixed rigidly to a brake caliper, with the shaft passing through it;
- the brake comprises a caliper and a member for returning the piston with respect to the caliper;
- the return member comprises a toric element made of elastomer;
- the brake comprises an adjuster compensating for the wear of the brake lining or linings;
- the adjuster is inserted between the actuator and the piston;
- the adjuster is able to apply a wedge effect; and
- the adjuster is able to immobilize the piston with respect to the actuator while the actuator is sliding in a first direction, and able to render the piston capable of moving with respect to the actuator while the actuator is sliding in a second direction.

Other features and advantages of the invention will become further apparent from the following description of a preferred embodiment and of some alternative forms which are given by way of non-limiting examples.

BRIEF DESCRIPTION OF THE DRAWINGS

FIG. 1 is a view in axial section of a brake according to a preferred embodiment of the invention;

FIG. 2 is a schematic part view in axial section of the brake of FIG. 1;

FIGS. 3 and 4 are views similar to FIG. 2 illustrating the transmission of forces respectively in the case of mechanical actuation and in the case of hydraulic actuation of the brake, the transmission of the forces being illustrated each time in the lower half-view while the upper half-view shows the brake at rest;

FIGS. 5 to 7 are three half-views in axial section similar to FIG. 2 illustrating three states of the brake at rest depending on the extent to which the pads are worn, the pads being illustrated respectively in the new state, with a modest amount of wear, and finally with a great deal of wear;

FIGS. 13 to 18 are views similar to FIGS. 11 and 12 illustrating three more embodiments of the adjuster; and FIG. 19 is a view similar to FIG. 2 illustrating an alternative form of embodiment of the brake.

DETAILED DESCRIPTION OF THE DRAWINGS

Figure 8:
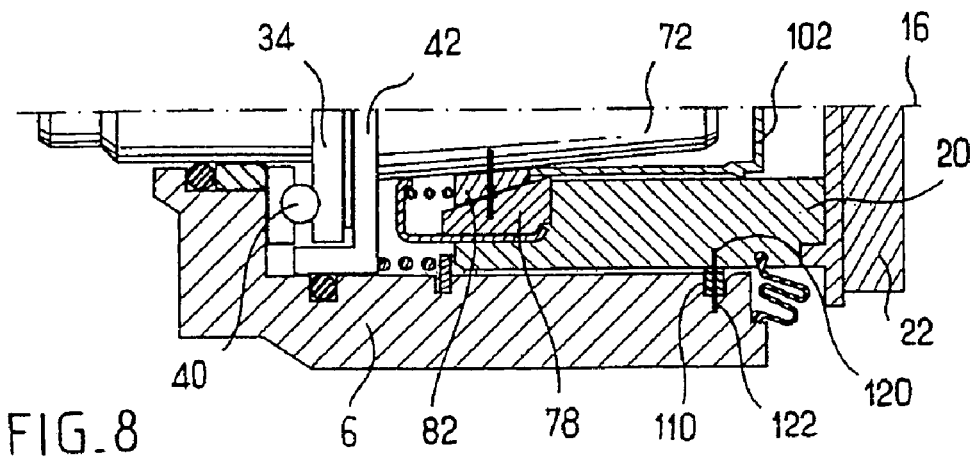
FIGS. 8 to 10 are three half-views in axial section similar to FIG. 2 illustrating the elastic return of the piston by the seal and the taking-up of play following pad wear, the figures respectively illustrating the brake before a braking action, during a mechanical braking action and then at the end of this action.

A preferred embodiment of the brake according to the invention has been illustrated in detail in FIG. 1 and more schematically in FIG. 2. The brake 2 comprises a caliper 4 comprising, in the way known per se, a main body 6, a nose 8 lying facing the body and an arch 10 connecting the nose to the body. The nose, the arch and the body give half the caliper the overall shape of a U, leaving an empty space 12 facing the arch between the nose and the body. In this embodiment, the vehicle disc brake has a built-in parking brake and can therefore be operated, on the one hand, by means of the vehicle hydraulic circuit using the brake pedal and, on the other hand, mechanically, by means of the parking brake lever handle.

The body 6 has an internal recess 14 of cylindrical overall shape of axis 16. The cylindrical recess 14 has, facing the nose 8, a distal axial end opening into the space 12.

The brake comprises a piston 20 of cylindrical overall shape housed in the cylindrical recess 14 and able to move in sliding therein along the axis 16. The piston 20 has a distal axial end bearing a brake lining, in this instance a pad 22, essentially of flat shape perpendicular to the axis 16. The nose 8 bears another lining 24 similar to the lining 22 extending parallel to the latter and facing it. As is well known, these two pads are intended to bear against two respective faces of one and the same disc (not illustrated) lying between them so as to brake it through the friction of the pads on the disc.

The brake 2 comprises an input shaft 26 of a type known per se, of axis 16, and connected in a way not depicted to the parking brake lever handle of the vehicle so as to be turned about its axis 16 under the effect of actuation of this lever handle.

The brake comprises a movement converter 32 able to convert the rotary movement of the input shaft 26 into a sliding movement and, on the other hand, a connecting device 70, compensating for wear, able to transmit this sliding movement to the piston. With reference to the direction in which forces are transmitted in the kinematic sequence during a braking action, the converter being upstream of the wear-compensating connecting means. We shall first of all describe the converter 32 before envisaging the connecting means 70.

The input shaft 26 is housed in a bearing of the body 6 of the caliper with the insertion of rolling bearing means 28 of a conventional type and, upstream of these, a conventional seal 30. The movement converter 32 comprises a plate 34 which, for greater clarity, we shall here term a sliding plate. This plate 34 has a flat circular shape of axis 16 and is fixed rigidly by one of its faces to the distal end of the shaft 26.

The converter also comprises another plate 36 of a shape similar to the plate 34 and which here we shall term the reaction plate. The plate 36 is coaxial with the sliding plate 34. It has a central orifice 38 through which the shaft 26 passes. The reaction plate 36 is fixed rigidly to the body 6 at the proximal axial end of the cylindrical housing 14.

The sliding 34 and reaction 36 plates therefore have faces facing each other and parallel to one another. Each of these two plates has grooves 37 made in these faces, each groove being in the overall shape of an arc of a circle centred on the axis 16. In addition, each groove has a depth that varies along the groove. The grooves are arranged as pairs of facing grooves. The converter 32 comprises balls 40 housed in the respective pairs of grooves and thus inserted between the two plates. There are, for example, three balls and therefore three pairs of grooves. The two plates with the balls are configured in a way known per se to form a device of the BIR (ball in ramp) type. This type of device as described for example in document EP-0 633 987 makes it possible, in the exemplary embodiment described here, to contrive for rotation of the shaft 26 about its axis to lead in addition to translation of this shaft along the axis 16 in the direction of the piston 20 so that the shaft follows a path close to a helicoid. The arrangement of the two plates in converters of the BIR type of the prior art generally had the purpose of converting the pure rotational movement of one of the plates into a pure sliding movement of the other plate. Given the arrangement of the discs in the current exemplary embodiment, particularly the fact that the reaction disc 36 is fixed rigidly to the caliper, the movement is converted differently this time. However, the arrangement of the grooves and of the balls does not vary fundamentally by comparison with the known arrangements.

The converter further comprises an actuator 42 comprising a plate of axis 16, of a shape similar to the sliding plate 34 and running parallel to and facing the latter. The actuator 42 also comprises a circumferential wall 44 extending from the edge of the plate 42 towards the proximal end of the cylinder, that is to say towards the shaft 26. The wall 44 and the plate 42 thus define an open housing receiving the sliding plate 34 such that it is coaxial with the actuator. The converter 32 comprises a sliding lining 46 inserted between the sliding plate 34 and the plate of the actuator 42 and in direct contact with these via its faces.

The actuator 42 is mounted so that it can move in sliding with respect to the body 6 in the recess 14 along the axis 16 by bearing of the wall 44 against the wall of the cylindrical recess. It follows from this arrangement of the actuator 42 with respect to the sliding plate 34 that the helicoid movement of the latter drives the actuator 42 with a pure sliding movement parallel to the axis 16 in the direction of the piston. To avoid any rotation of the actuator about the axis, provision may be made for this rotation to be impeded by means of a screw or a similar element projecting from the actuator into a groove of the body 6 parallel to the axis 16 or conversely projecting from the body 6 into a groove of the actuator. When this is the case, the helicoid movement of the input shaft 26 causes the actuator 42 to slide along the axis 16.

The body 6 has a groove 50 made in the cylindrical wall of the recess 14 facing the wall 44 of the actuator to accommodate a seal 52 sealing against brake fluid, in this instance a liquid, between the wall 44 on the one hand and the body 6 on the other. Such sealing is also afforded by the seal 30 contiguous with the input shaft 26. Given the arrangement of these parts and, in particular, the arrangement of the two seals 30 and 52, the brake 2 comprise a chamber 54 full of pressurized brake fluid bounded, on the downstream side, that is to say in the direction of the piston, by the plate of the actuator 42. This chamber 54 is also bounded by the proximal part of the body 6 extending as far as the seal 30. The elements bathed in the brake fluid are therefore the bearing 28, the reaction disc 36, the balls 40, the sliding plate 34, the lining 46 and, via just some of its faces and facets, the actuator 42. It can therefore be seen that the piston 20 is wholly outside this chamber 54 and distant from it. The brake in this instance comprises a second chamber 56 that we shall term the "dry chamber", essentially full of air at atmospheric pressure and in which in particular the piston 20 is bathed. This chamber is bounded on the same side as the shaft 26 by the distal face of the actuator 42.

The liquid chamber 54 is supplied with brake fluid and placed under pressure from a master cylinder in a way known per se by means of conventional ducts and ports which have not been depicted. Given this configuration of the chambers 54 and 56, actuation by the driver of the vehicle brake pedal causes the pressure in the chamber 54 to rise and this has the effect of urging the actuator 42, from its proximal face, in the direction of the piston. This urging causes the actuator 42 to slide along the axis 16. The shaft 26, the sliding plate 34 and the balls 40 and, of course, the reaction plate 36 remain stationary during these movements.

At the dry chamber 56, there is a groove formed in the cylindrical face of the recess 14 to house a washer 60 extending as a radial projection with reference to the axis 16 into the recess 14 so as to act as a rest for a return spring also bearing in the opposite direction against the distal face of the actuator 42 extending into the dry chamber. This spring 62 constitutes a return means allowing the actuator 42 to be returned towards the shaft 26 when the hydraulic braking command ceases.

We shall now describe the connecting and wear-compensating means 70 inserted between the actuator 42 and the piston 20 so as to transmit the movement from the actuator to the piston.

The adjuster 70 comprises a male bearing piece 72 of axis 16 elongated along this axis and fixed rigidly by its proximal end to the actuator 42. The bearing piece has a circumferential face 74 which in this instance has a frustoconical shape, the cross section of the cone decreasing towards the pads.

The piston 20 has a proximal end in which a shoulder 76 is formed. The adjuster 70 comprises a female bearing piece 78 housed in the shoulder 76. In particular, a distal face of the female piece 78, of flat shape perpendicular to the axis 16, bears against a corresponding face of the shoulder. The female piece 78 also has an essentially cylindrical peripheral face. Finally, it has an internal face 80 which in this instance is frustoconical, the cross section of the cone here too decreasing towards the pads. The female piece 78, of axis 16, is open at both its axial ends.

Figure 11:
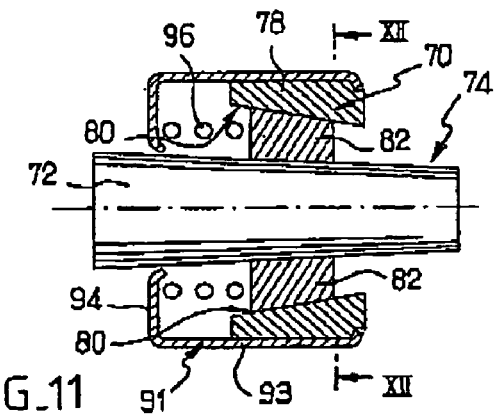
FIG. 11 is a simplified view in axial section of the brake adjuster of FIG. 2 showing the configuration of the wedge-effect elements.
Figure 12:
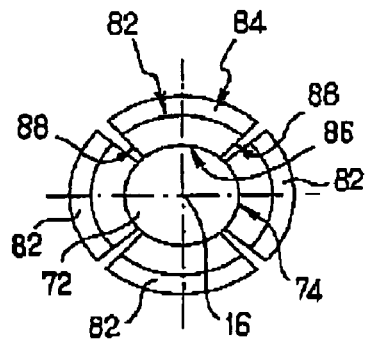
FIG. 12 is a view in section on XIX—XII of the elements of FIG. 11.

The adjuster 70 has wedges 82 of which there are at least two and in this instance four. The wedges 82 are identical to each other. With reference to FIGS. 2, 11 and 12, each wedge 82 has two faces external and internal 84 and 86 each in the shape of a quarter of a cone. What we mean by that is that each face is defined by a cone surface but that this surface is broken without being able to extend right around the axis of the cone. The two faces 84 and 86 have the axis 16 for their axis. Each wedge 82 has two lateral flat faces 88 of flat shape extending in a plane radial to the axis 16. They also have two end faces, distal and proximal 90, 92 also flat and extending at right angles to the axis 16. The four faces 88, 90 and 92 each join the two faces 84 and 86 to each other.

The male bearing piece 72 extends into the orifice of the female bearing piece 78 coaxially with respect to it. The wedges 82 are inserted radially between the two male and female bearing pieces, also being distributed about the circumference of the male piece, the lateral faces 88 of the wedges facing each other.

The male piece 72 has a length along the axis 16 which is far longer than the length of the female piece 78 and than the length of the wedges 82. The length of the male piece here is about four times the length of the wedges. More generally, it may be between twice this length and eight times this length.

The wedges are each intended to bear simultaneously against the face 80 of the female piece and the face 74 of the male piece. As will be seen in what follows, the wedges may bear against the male piece near the actuator 42 or near the distal free end of the male piece depending on the degree to which the pads are worn.

Now, given its shape, the radius of the male piece decreases towards the distal end. In this particular instance, it is chosen for the internal face 86 of the wedges to be given a radius roughly identical to the radius of the face 74 of the male piece 72 mid-way along this face. In that way, when the wedges 82 are bearing against [lacuna] central part of the male piece, contact between the face 74 and the face 86 is almost surface contact. By contrast, when the wedge 82 is bearing against the male piece over half the face 74 closest to the actuator 42, contact is essentially along the two edges of the wedge 82 defined by the meetings of the lateral faces 88 with the internal face 86. If, on the other hand, the internal face 86 of the wedges is given a radius equal to the largest radius of the male piece, then linear contact occurs along the mid-plane of the face 86 for all the other wedge positions.

For the same reasons, the external face 84 of each wedge is given a shape such that contact between this face 84 and the internal face 80 of the female piece is, on the whole, surface contact when the wedge lies facing the central part of the female piece. Thus, when the wedge is made to move gradually towards the more distal part of this piece, contact changes gradually into a linear contact along the two edges defined by the meetings of the faces 88 with the face 84, this too because of the reduction in the radius of the contact face of the female piece.

Alternatively, it would be possible to choose to give the internal face 86 of the wedges a radius more or less identical to the smallest radius of the face 74 of the male piece 72.

The adjuster 70 comprises a cage 91 comprising a circumferential cylindrical wall 93 inserted between the external cylindrical face of the female piece 78 and the face facing it of the shoulder 76. This wall 93 is continued in the radial direction at its distal edge by a fold. The cage 91 also has a proximal wall 94 essentially flattened perpendicular to the axis 16 extending radially from the proximal edge of the wall 93.

The adjuster 70 comprises a spring resting, on the one hand, in the proximal direction, on a face of the wall 94 and in a distal direction on the other hand on a proximal face of the wedges 82. Thus, the wedges 82 are constantly urged along the axis 16 in the distal direction, that is to say towards the pads.

The piston 20 at its centre has a cylindrical recess 100 opening at its proximal axial end so that the male piece 72 can penetrate the recess 100, closed off at its distal axial end by the pad 22. The brake comprises an unlocking piece 102 housed in this recess. This piece comprises a cylindrical wall 104 and a flat distal wall 106 perpendicular to the axis 16 and extending to the distal edge of the wall 104. The unlocking piece is sized so that the free proximal axial end edge of the piece can come into contact with the distal end of the wedges 82 and bear against them, the male piece 72 then being accommodated in part in the unlocking piece. The latter can then urge the wedges along the axis 16 in the direction of the shaft 26. To allow the unlocking piece to be actuated for that purpose, an orifice opening radially into the piston from outside the latter may be provided near its distal end.

The unlocking piece 102 bears on its cylindrical wall 104 a lip 105 extending as a projection radially out from this wall with reference to the axis 16 and in contact with the internal face forming the central cylindrical recess of the piston. Thus, the unlocking piece provides a certain degree of sealing between the chamber 54 and the external atmospheric air, particularly with regard to dust.

The brake comprises a seal 110 of circular shape of square cross section housed in a groove of the body 6 so as to bear against the cylindrical external face of the piston. The proximal side of this groove is perpendicular to the axis 16 while the distal side is curved to allow the seal to deform towards the pads under the effect of the movement of the piston. Given the fact that this seal is not in contact with the liquid of the chamber 54, it plays no sealing function against this liquid and its function is mainly to return the piston elastically with respect to the caliper as will be seen later on. It does, however, have a sealing function with regard to the dry chamber 56 and the external air.

The brake also comprises a lip 112 having its respective edges housed in a shoulder of the caliper and in a groove of the piston so as to isolate the chamber 56 from dust and dirt regardless of the position of the piston.

The way in which this brake works and the properties of this brake will now be described.

FIGS. 3 and 4 illustrate the transmission of forces during braking.

FIG. 3 shows the case where a braking action is commanded by means of the parking brake lever handle. The rotation action generated by this lever handle at the shaft 26 is converted by the converter 32 into a helical movement of this shaft which itself causes the actuator 42 to slide along the axis 16 towards the pads. Because the wedges 82 are pressed both against the male piece and against the female piece and because their contact faces are inclined, this force is transmitted from the male piece 72 to the wedges 82 then to the female piece 78 and finally to the piston 20 and to the pad 22 fixed thereto.

FIG. 4 illustrates the case where the braking is commanded by the hydraulic circuit of the vehicle via the brake pedal. In this situation, the increase in pressure of the liquid in the chamber 54 causes the actuator 42 to slide towards the pads and this, in the same way as in FIG. 3, causes forces to be transmitted from the actuator 42 to the pad 22 through the male piece, the wedges, the female piece and the piston.

It will be noted that these movements of the actuator, of the male piece, of the wedges, of the female piece and of the piston with respect to the caliper in the first direction 107 occur with no relative movement of these pieces relative to one another. In addition, at that time there is no play between these pieces which remain immobile with respect to one another and move as one with respect to the caliper.

Figure 9:
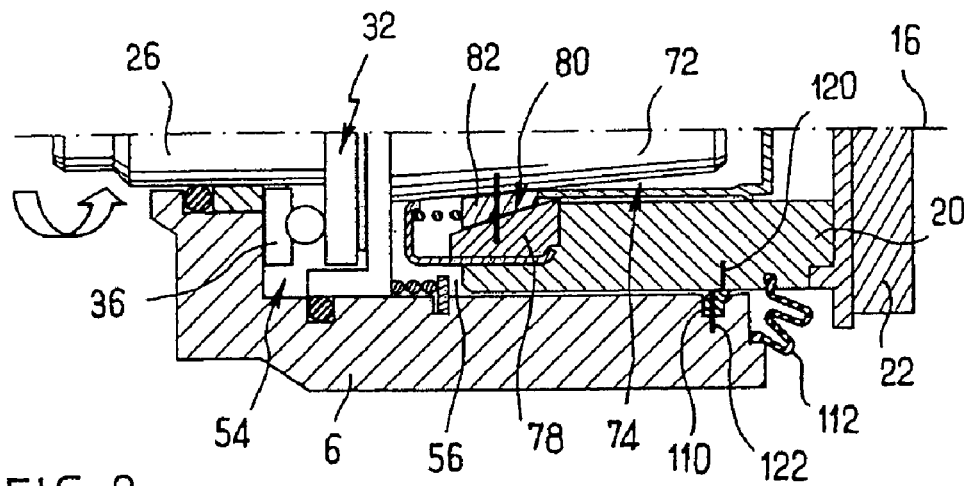

FIG. 8 illustrates the brake at rest while FIG. 9 shows it in a situation identical to that of FIG. 3, that is to say when a mechanical braking command is received that causes all the pieces situated between the actuator 42 and the pad 22 to slide with respect to the caliper. During this movement, the movement of the piston with respect to the caliper causes deformation of the seal 110. During braking, the rubbing of the pads 22 and 24 on the disc causes slight wearing thereof. The seal 110 is configured so that during the braking travel the piston not only deforms the seal but also slides slightly with respect to the latter towards the disc over a length corresponding to the sum of the reduction in thickness of the pads during this action. The marks 120 and 122 in FIG. 9 show the movement of the piston with respect to the seal, by comparison with their alignment in FIG. 8.

Figure 10:
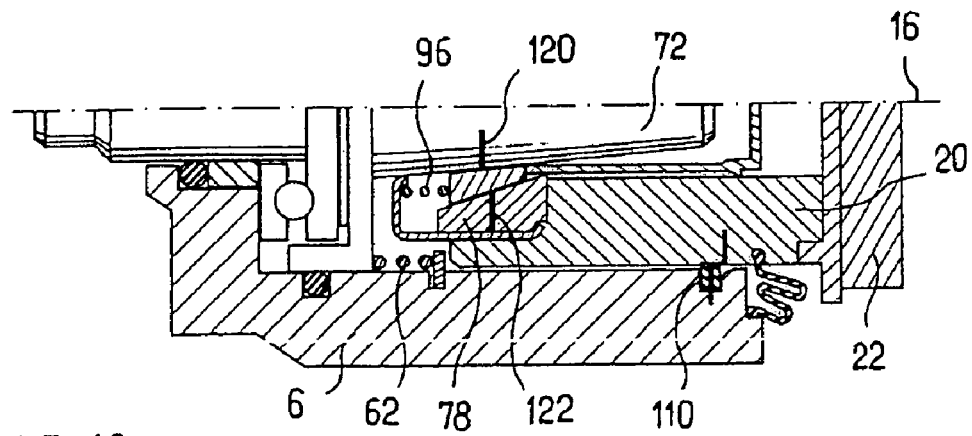

When the braking command is interrupted, the spring 62 returns the actuator 42, the input shaft and the male piece 72 in the direction away from the disc. The piston 20 for its part is returned in the same direction, on the one hand, under the effect of the reaction caused on the disc in contact with the pads and, on the other hand, under the effect of the elastic return produced by the seal 110 which reverts to its original shape. However, because of the sliding which has occurred between the piston and this seal, the position the piston arrives in is slightly offset from its starting position, the piston now being slightly closer to the nose 8. It then follows that there is a difference in position between the male piece 72 and the female piece 78. The play thus created is immediately taken up by the wedges 82 which, under the effect of the spring 96, once again place themselves bearing simultaneously against the male piece and the female piece. FIG. 10 illustrates this situation in which the piston has adopted a position of rest slightly offset from its starting position as indicated by the marks 120 and 122 which in FIG. 8 initially coincided. The wedges occupy an intermediate position between these two marks.

The brake is therefore once again in a situation such that there is no sliding play between the pieces lying between the actuator and the pad 22. In consequence, during the next braking action, these pieces will be able to transmit the forces by moving once again as one with respect to the caliper 4 as was seen above.

It follows from this operation that the wedges 82 are made to move gradually towards the nose of the caliper as the pads 22 and 24 wear as illustrated by FIGS. 5 to 7. More specifically, the wedges 82 move along the male piece 72 and, to a lesser extent, the wedges move along the female piece 78, this latter movement being more modest given the arrangement of the pieces in this embodiment. It can therefore be seen that the device 70 performs its function of compensating for pad wear.

Furthermore, the seal 110 allows the piston to be returned over a constant travel regardless of the extent to which the pads are worn, so as to maintain the piston operating travel in spite of the compensation for wear performed by the adjuster 70.

The adjuster 70 is able, through a wedge effect, to prevent the piston from being retreated manually towards the shaft 26 with respect to the caliper with a view to manual operation of the brake during a maintenance operation. To allow work to be carried out on the brake in this situation it is possible to actuate the unlocking piece 102 so that it bears against the distal end of the wedges to urge them towards the shaft 26. This bearing occurs in the opposite direction to the wedge effect against the action of the spring 96 and therefore causes the wedges to be retreated, which then allows the piston to be moved by hand.

FIGS. 13 to 18 illustrate three other embodiments of the wedges and of the male and female pieces. In the description of these embodiments, elements similar to those of the first embodiment bear references increased by 100, 200 or 300 and no further explanation is provided.

Figure 13:
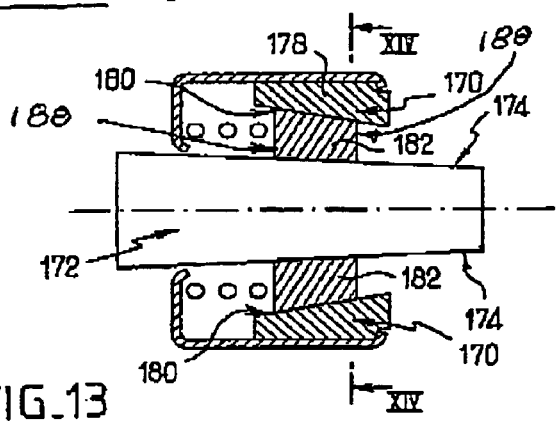
Figure 14:
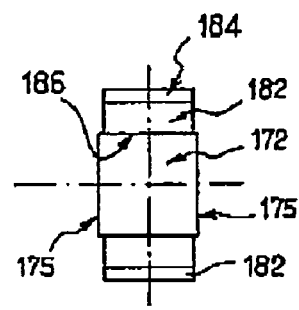

In the embodiment of FIGS. 13 and 14, the wedges 182 are in the form of pads, all the faces of which are flat, their contact faces 184 and 186 being flat inclined with respect to one another so as to produce the wedge effect. Contact between the wedges 182 and the male 172 and female 178 pieces is here, each time and regardless of the degree of wear of the pads, surface contact. The lateral faces 188 of the wedges are flat and directed at right angles to the axis 16. The front and rear faces are flat and perpendicular to the axis 16.

The male piece 172 here has two flat faces 174 extending in opposition to one another on each side of the axis 16. These two faces are inclined slightly towards the nose of the caliper with respect to the axis 16 and with respect to one another so that the height of the male piece 172 once again decreases towards this axis. The male piece also has two flat and mutually parallel lateral faces 175, the four faces 174 and 175 giving the male piece a rectangular profile.

Here the female piece 178 is split into two separate elements extending respectively facing the faces 174. Each element 178 has a flat face 180 inclined with respect to the axis 16 in the same direction as the face 174 but this inclination is steeper. The inclination of the two faces 184, 186 of each wedge corresponds strictly to the inclination of the respective faces with which they are intended to come into contact. In this instance there are two wedges, the lateral faces 175 of the male piece being unused. However, the races 175 also could be arranged in an inclined configuration and be associated with other wedges and female piece elements so that the wedge effect occurs also with regard to these faces. The operation of the wear adjuster 170 is identical to that of the device 70 described with reference to FIG. 2.

Figure 15:
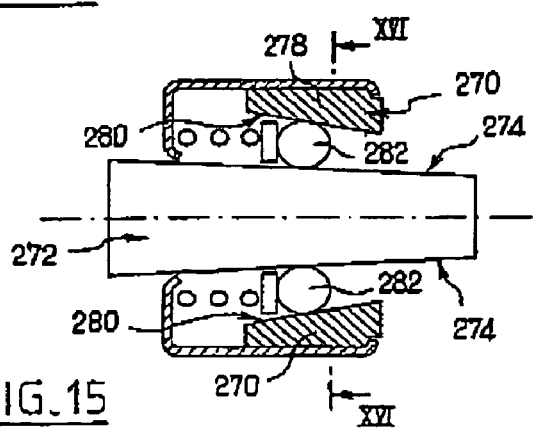
Figure 16:
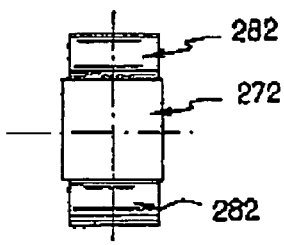

FIGS. 15 and 16 exhibit another embodiment of the adjuster 270. The male 272 and female 270 pieces are configured in the same way as in the embodiment of FIGS. 13 and 14. The wedges 282 here are formed by cylindrical rollers. Contact between the rollers and the male and female pieces here is, each time, a linear contact directed at right angles to the axis 16. Whereas in the two previous embodiments the movement of the wedges with respect to the male and female pieces was a movement of pure sliding, the movement of the rollers in this embodiment may involve, in addition to the sliding component, a rolling component. The other aspects of the operation of the adjuster are identical to those of the previous embodiment. Here again, there are two wedges 282, but a higher number of wedges could be envisaged. To make it easier for the spring 96 to bear against the wedges, a one-piece intermediate piece is provided.

Another embodiment of the adjuster is illustrated in FIGS. 17 and 18. The male 372 and female 370 pieces here once again have a frustoconical overall shape identical to that of the first embodiment. Here there are six wedges 382 formed of balls able at every moment to ensure point contact with each of the male and female pieces. In order to maintain correct ball positioning about the axis 16 as the balls move as a function of pad wear, grooves 373 may be formed in the external face of the male piece 372, each groove running along the male piece from one of its ends to the other and being intended to each accommodate one of the balls. As they move, the balls travel along the grooves. Similar grooves may be made in the female piece 370, or just on this piece. When the balls are housed in the grooves, contact between the ball and the corresponding piece is on an arc of a circle. In particular, provision may be made for the grooves accommodating the balls to have a constant radius and a constant depth along the male piece so that the grooves converge towards the distal end of this piece. The way in which the adjuster works here is again similar to the operation of the adjusters of the previous embodiments.

Numerous embodiments of the adjuster are conceivable in addition to those described here. In particular, there is freedom to alter the shape of the wedges and of the male and female pieces. In addition, the number of wedges can be chosen at will provided that there are two or more of them.

Sometimes in disc brakes the two pads 22 and 24 remain in contact with the disc after a braking action and even though this action has been interrupted. The piston thus remains at the end of its travel. In certain conventional brakes, the disc, bearing in mind its inevitable flatness defects, then pushes the piston spontaneously over a short amount of travel in order to release.

With the brake according to the invention, the actuator 42 would be returned towards the reaction disc 36 because of the presence of the spring 62. It would then normally follow that the wedges 82 would move towards the nose of the caliper so as to fill all the space lying radially between the male and female pieces. This situation would lead to irrevocable blockage of the piston in contact with the disc given the wedge effect produced by the wedges. The wedges would therefore prevent the disc from spontaneously pushing the piston back over a short travel with a view to releasing as normally occurs. That would lead to constant braking, leading to excess fuel consumption and, furthermore, to a high risk of scorching the linings.

The alternative form illustrated in FIG. 19 aims to solve this problem. In this alternative form, the male piece 472 is made in two parts. It comprises a cylindrical shaft 472*a* fixed rigidly to the actuator 42 and a slider 472*b* coaxial with the male piece. The slider has a cylindrical internal face by means of which it is slipped over the shaft able to move in sliding thereon. It also has an external frustoconical contact face 74 identical to that of the previous embodiments. The shaft 472*a* has, near its free distal end, a groove housing a slider stop such as a circlip 479. The distance between the circlip and the actuator is greater than the length of the slider which therefore has a small sliding travel delimited, on the one hand, by its coming into abutment against the actuator and, on the other hand, by its coming into abutment against the circlip. The slider 472*a* can move in sliding with respect to the actuator 42 over a travel which is shorter than a nominal travel of the actuator with respect to the caliper 6, so that the actuator is able to drive the slider during its nominal travel backwards once the actuator has advanced as will be seen later on.

In normal operation, this brake behaves exactly like those of the previous embodiments, the two parts of the shaft remaining immobile with respect to one another.

By contrast, if the actuator and the shaft 472*a* begin to retreat while the piston 20 remains in the forward position with the pad 22 rubbing against the disc, the slider 472*b* also remains in the forward position, immobile with respect to the piston. However, an axial clearance arises between the actuator 42 and the proximal end of the slider 472*b*, this clearance being large enough to allow the disc to cause the piston to retreat so as to separate the pads from the disc and eliminate the braking action. The residual clearance is then filled by the advancing of the wedges. It can be seen in these various embodiments that the pad wear adjuster acts without however reducing the nominal travel of the piston. This compensation device in fact behaves like a free wheel in an axial version, that is to say that it allows a relative movement of the pieces of the moving gear when the moving gear slides towards the shaft 26 but prevents any relative movement when the moving gear moves in the opposite direction of travel. It also has the advantage of constituting an autoclave [sic] system, that is to say that it prevents any movement of the pieces under the effect of the vibrations of the vehicle. It is not absolutely essential to provide means for correctly positioning the wedges with respect to one another around the axis 16. This is because, owing to the characteristics of the device, should they come into contact with one another, they would then move away from each other naturally. However, it is conceivable to provide such positioning means.

The seal 110 which elastically returns the piston is essentially identical to the seal which, in addition, in brakes of the prior art, would provide sealing by isolating the pressurized-liquid chamber from atmospheric air. This seal has been kept in its structure even though it is no longer contiguous with the pressurized-liquid chamber. It will be easy for the person skilled in the art to configure this seal to cause the piston to slide when the travel reaches a predetermined threshold.

The male piece and possibly the female piece could be manufactured by forging or by turning. However, the preferred method of manufacture is rolling. The pads could be produced of metal by sintering or in plastic by moulding. When choosing materials, consideration will be given to the fact that deformation and wear of the wedges is to be preferred over that of the male and female pieces. The piston could be made of bakelite or of steel.

Furthermore, as can be seen, whatever the mode of braking chosen, hydraulic or mechanical, no piece moves without playing a part in transmitting stress. In addition, downstream of the actuator 42 and from the actuator onwards, it is the same pieces which move regardless of the mode of braking chosen.

Furthermore, as the pressurized-liquid chamber extends upstream of the actuator 42 and is delimited by the latter, a small number of brake components are bathed in this chamber. The pieces following on from the actuator in the downstream direction, namely the male and female pieces, the wedges and the piston, extend into the dry chamber 56 without being in contact with the brake fluid.

What is more, the liquid chamber, extending some distance away from the piston and the pads, is further protected from the heat generated by the contact between the pads and the disc while arranging the piston contiguous with the liquid chamber could lead to heating of this chamber and the generation of water vapour in the brake fluid, thus lowering its boiling point.

The two chambers separated by the actuator 42 could be arranged with a pad wear adjuster other than the wedge effect adjuster described. It could in particular be an adjuster with a push-rod formed by a screw/nut assembly or alternatively be a toggle lever adjuster, both known in the prior art. It is even conceivable, although this is theoretically disadvantageous, to employ this configuration of chambers without providing a pad wear adjuster.

Each of the male and female pieces could be made in one or more parts.

The seal 30 could be of rectangular cross section. In general, each of the seals may have different shapes (O-ring, rectangular section, etc.).

The return function of the seal 110 may be provided by an elastic ring other than a seal.

I claim:

1. A disc brake for a vehicle having a housing (6) with a recess (14) therein that is separated by a thrust plate (42) to define a first chamber (54) that is connected to receive pressurized fluid from a source and a second chamber (56) connected to the surrounding environment, an actuator including an input shaft (26) and a converter (32) that is located in said first chamber (54), said converter (32) including a reaction plate (36) that is fixed from rotation within said first chamber (54), a sliding plate (34) secured to said input shaft (26) and housed within said thrust plate (42), a plurality of balls (40) retained in variable depth grooves (37) in the sliding plate (34) and reaction plate (36) and a sliding lining (46) located between the sliding plate (34) and thrust plate (42), said input shaft on receipt of a rotary input acting to convert rotational movement of the input shaft (26) into a sliding movement of the thrust plate (42) to provide a first force that acts on said thrust plate (42) and mechanically moves a piston (20) located in said second chamber (56) to effect a first brake application while pressurized fluid on being supplied to said first chamber (54) directly acts on and moves said thrust plate (42) to provide a second force to hydraulically move said piston (20) to effect a second brake application, return means (62) that only acts on said thrust plate (42) for urging said sliding plate (34) toward said reaction plate (36) to define a position of rest, an elastomeric seal (110) for returning the piston (20) to a position of rest within said recess (14), an adjuster (70) that is located between the thrust plate (42) and the piston (20) to compensate for wear of brake lining or linings (22, 24) of the brake, said adjuster (70) having a first conical member (74) that extends from the thrust plate (42) defines a first bearing piece (72), a second bearing piece (80) affixed to the piston (20), a wedge (82,182,282) located between said first (72) and second (80) bearing pieces, and a spring for moving said wedge (82,182,282) such that movement of said first bearing piece (72) is directed into said piston (20) through the second bearing piece (80).

2. The brake according to claim 1, characterized in that the adjuster (70) immobilizes the piston (20) with respect to the thrust plate (42) while when the thrust plate (42) slides in a first direction, and holds the piston (20) stationary when the thrust plate (42) slides in a second direction.

\* \* \* \* \*